(12) United States Patent
Autenrieth et al.

(10) Patent No.: US 11,421,291 B2
(45) Date of Patent: Aug. 23, 2022

(54) PROCESS FOR LOCAL HARDENING

(71) Applicant: Robert Bosch GmbH, Stuttgart (DE)

(72) Inventors: Hermann Autenrieth, Ruit (DE);
Marcus Hansel, Altdorf (DE); Michael Cesinger, Lohr Am Main (DE);
Thomas Waldenmaier, Freiberg/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 17/008,968

(22) Filed: Sep. 1, 2020

(65) Prior Publication Data
US 2021/0079490 A1 Mar. 18, 2021

(30) Foreign Application Priority Data
Sep. 13, 2019 (DE) ...................... 10 2019 213 964.7

(51) Int. Cl.
*C21D 5/00* (2006.01)
*C21D 1/18* (2006.01)
*C21D 1/42* (2006.01)
(52) U.S. Cl.
CPC .................. *C21D 5/00* (2013.01); *C21D 1/18* (2013.01); *C21D 1/42* (2013.01); *C21D 2211/009* (2013.01); *C21D 2221/00* (2013.01)

(58) Field of Classification Search
None
See application file for complete search history.

(56) References Cited

U.S. PATENT DOCUMENTS

| 5,876,523 | A | * | 3/1999 | Nagayoshi | ............... C21D 5/00 148/614 |
| 2011/0274946 | A1 | * | 11/2011 | Severing | .............. D21G 1/0246 428/683 |
| 2020/0165710 | A1 | * | 5/2020 | Minamino | .............. C22C 38/06 |

FOREIGN PATENT DOCUMENTS

JP 2001020014 A * 1/2001

OTHER PUBLICATIONS

Machine translation of JP 2001-020014 (Year: 2021).*

* cited by examiner

*Primary Examiner* — Patricia L. Hailey
*Assistant Examiner* — Christopher D. Moody
(74) *Attorney, Agent, or Firm* — Maginot, Moore & Beck LLP

(57) ABSTRACT

A process for the local hardening of a workpiece by means of local induction hardening includes performing a local perlitization grain transformation on the workpiece after a local inductive diffusion heat treatment and before a local induction hardening on the workpiece.

19 Claims, 2 Drawing Sheets

PROCESS FOR LOCAL HARDENING

This application claims priority under 35 U.S.C. § 119 to application no. DE 10 2019 213 964.7, filed on Sep. 9, 2019 in Germany, the disclosure of which is incorporated herein by reference in its entirety.

The present disclosure relates to a process for the local hardening of a workpiece.

BACKGROUND

To improve their wear resistance, workpieces such as shafts, cylinders, control valves, seat geometries or edges of a valve are subjected to an inductive heat treatment. Starting materials are here usually steels or cast steel having a homogeneous microstructure.

Hydraulic valves having control edges and seat geometries are frequently made of various grades of cast iron. The wear resistance requirements for such geometries are increasing continuously. These requirements can be satisfied according to the prior art by local hardening by means of inductive heat treatment (HT).

Compared to steel and cast steel, cast iron materials used are significantly more inhomogenous. The initial state is, however, also firstly present in a ferrite/perlite ratio which can fluctuate greatly due to casting conditions. An important criterion for achieving a good hardened microstructure is uniform dissolution of the carbon inherent in the material in the low-carbon, ferrite constituents of the microstructure.

In the inductive hardening mentioned, the multiphase material is heated in its entirety or partly to austenitization temperature and held at temperature for a number of seconds. However, depending on the degree of austenitization achieved locally, a comparative inhomogeneous hardened microstructure, which is as mentioned disadvantageous, is established in the subsequent quenching.

Previous inductive approaches to solving the problem of making the heat treatment result in uniform multiphase materials are characterized by increasing the austenitization temperature, the duration of austenitization or a combination of the two. Disadvantages of this are first and foremost the increase in the distortion of the workpiece and also the risk of incipient melting at the edges to be hardened and at surrounding edges.

Another possible way of homogenizing the multiphase initial state, i.e. achieving a homogeneous hardened microstructure, is a preceding multihour heat treatment of the workpiece. Here, the intention is to bring the carbon present in an increased concentration locally into low-carbon constituents of the microstructure by means of diffusion under targeted process conditions in a first step and to set the desired ratio of the microstructural phases ferrite/perlite by means of targeted cooling conditions.

Disadvantages of this solution are firstly an entire heat treatment of the component with undesirable secondary effects, for example distortion, a change in the mechanical properties, or the like, and secondly poor economics due to long process times and additional plant engineering.

SUMMARY

In the light of the above, it is an object of the disclosure to provide a process which makes a more homogeneous hardened microstructure possible with at least the same economics.

A process for the local hardening of a workpiece, in particular a shaft or a valve body, in particular a valve slider, or a housing section of a hydraulic valve, in particular in the region of control geometries such as a valve seat or a control edge, has a step of "local induction hardening". According to the disclosure, a preceding step of "local, in particular inductive, diffusion heat treatment, in particular proceeding from an initial state", in which the material is, in particular, firstly brought to a higher degree of homogenization in respect of its carbon distribution, is provided. A temperature in the diffusion heat treatment is, in particular, in a range from about 900 to 1150° C. In addition, a step of "local grain transformation, in particular perlitization", by means of which the in particular austenitic constituents of the microstructure are locally converted back into a state which is similar to the initial state in respect of ferrite/perlite and, compared to the initial state, has a microstructure distribution which is significantly more advantageous for the subsequent, inductive heat treatment, namely induction hardening, is according to the disclosure carried out between the abovementioned steps.

The local state or microstructural state produced in the workpiece by means of the two steps according to the disclosure is, owing to the increased homogeneity, characterized by an improved heat treatment capability which in the hardened state is reflected in an increased hardness and reduced hardness fluctuations due to smaller proportions of ferrite.

A temperature of the grain transformation is preferably 500-800° C.

The material of the workpiece is preferably cast iron having an increased proportion of ferritic constituents.

In a further development of the process, the "local diffusion heat treatment" is carried out comparatively briefly compared to the "local induction hardening". A ratio of diffusion heat treatment time to the induction hardening time is here approximately in the range from 0.3 to 0.8, preferably from 0.4 to 0.5.

In a further development of the process, the "local grain transformation" is carried out for a time comparable to that of the "local induction hardening". A ratio of grain transformation time to the induction hardening time is here approximately in the range from 0.8 to 1.2, and is preferably 1.0.

In a further development of the process, the "local diffusion heat treatment" is carried out at a temperature which is the same as or slightly lower than that in the "local induction hardening".

A working example of a process according to the disclosure is depicted in the drawings. The disclosure will now be explained in more detail with the aid of the figures of these drawings.

DETAILED DESCRIPTION

Figure 1:
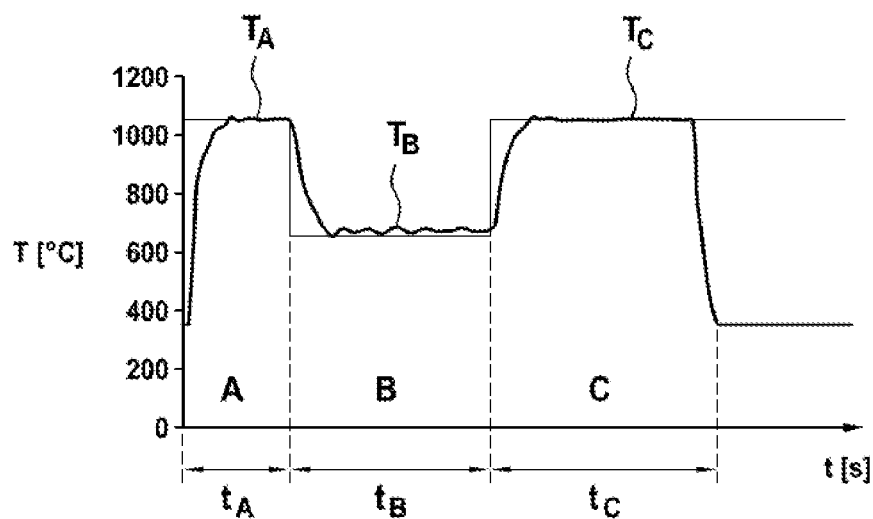
FIG. 1—a process according to the disclosure for induction hardening.

FIG. 1 shows a temperature-time graph of a working example of a process according to the disclosure for induction hardening, with this proceeding in three steps A, B, C. These are a local, brief, inductive diffusion heat treatment A, a local grain transformation by perlitization B and finally the local induction hardening C. Here, the process steps are assigned the individual times diffusion heat treatment time $t_A$, grain transformation time $t_B$ and induction hardening time $t_C$.

The temperature $T_A$ of the local diffusion heat treatment A is slightly lower than the temperature $T_C$ of the induction hardening in the working example shown. It is about 1050° C. The temperature $T_B$ of the intermediate step of "grain transformation by perlitization" B is about 650° C. in the working example shown. The duration of the diffusion heat treatment $t_A$ is about 40-50% of the duration $t_C$ of the induction hardening in the working example shown. The duration $t_B$ of the grain transformation is approximately equal to the duration $t_C$ of the induction hardening in the working example shown.

Figure 2:
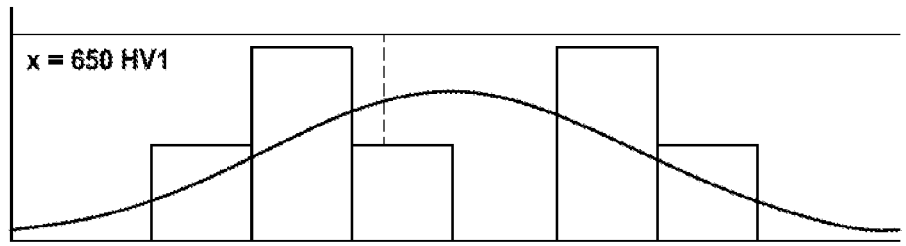
FIG. 2—a microstructural composition before induction hardening according to a conventional process, FIG. 3—a microstructural composition before induction hardening according to the process of the disclosure, FIG. 4—a section through the microstructure of the microstructural composition as per FIG. 2, and FIG. 5—a section through the microstructure of the microstructural composition as per FIG. 3.

FIG. 2 represents a microstructure distribution as is established after the local induction hardening C without the process steps A and B according to the disclosure having taken place, i.e. as is present in the case of conventional induction hardening. The distribution in FIG. 2 is comparatively broad; the microstructure is thus comparatively heterogeneous.

Figure 4:
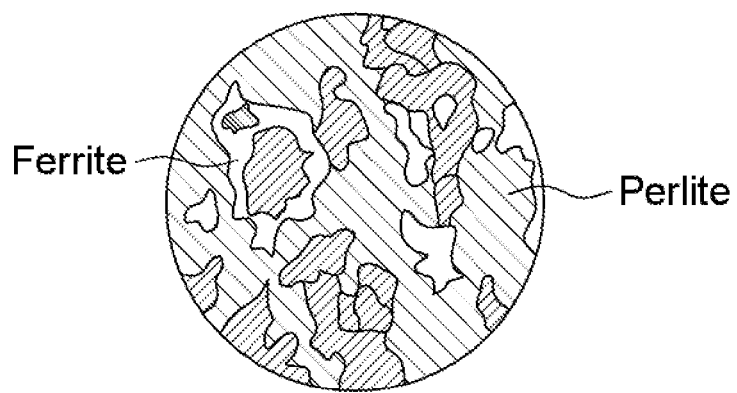

A section of the microstructure shown in FIG. 4 resulting from a conventional process as per FIG. 2 shows this heterogeneity in respect of ferrite and perlite.

Figure 3:
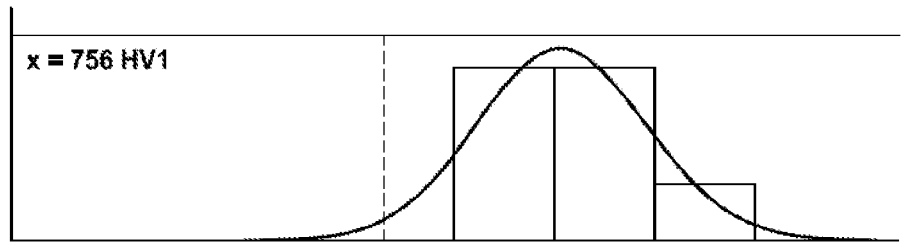

FIG. 3 represents the microstructure distribution as is established before the local induction hardening C but after the two process steps A and B according to the disclosure have proceeded. The distribution as shown in FIG. 3 is comparatively narrow, and the microstructure is thus comparatively homogeneous. The hardness distribution after induction hardening C has been carried out will accordingly be homogeneous.

Figure 5:
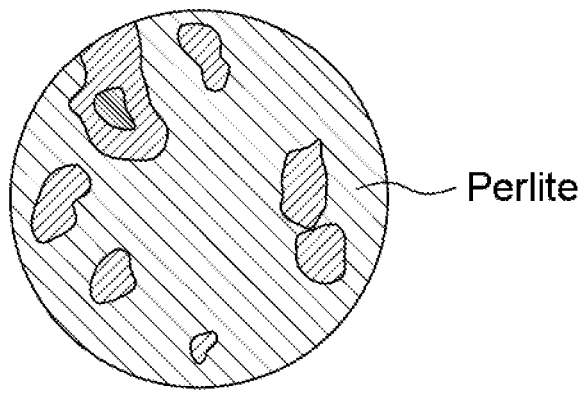

FIG. 5 clearly shows this more homogeneous microstructure after the two process steps A and B according to the disclosure and the local induction hardening C have occurred.

A process for the local hardening of a workpiece, in which a local induction hardening is preceded firstly by a local, brief, in particular inductive, diffusion heat treatment and then a grain transformation, in particular perlitization, so that after the latter step and before the induction hardening a microstructural state is locally homogenized in respect of ferrite/perlite before induction hardening is disclosed.

What is claimed is:

1. A process for a local hardening of a workpiece comprising:
   performing a local inductive diffusion heat treatment on the workpiece;
   performing a local perlitization grain transformation on the workpiece after the local inductive diffusion heat treatment; and
   performing a local induction hardening on the workpiece after preforming the local perlitization grain transformation on the workpiece.

2. The process according to claim 1, wherein a ratio of a duration of the local inductive diffusion heat treatment to a duration of the local induction hardening is from 0.3 to 0.8.

3. The process according to claim 2, wherein a ratio of a duration of the local perlitization grain transformation to the duration of the local induction hardening is in a range from 0.8 to 1.2.

4. The process according to claim 3, wherein the local inductive diffusion heat treatment is carried out at a temperature which is the same as or lower than a temperature at which the local induction hardening is carried out.

5. The process according to claim 4, wherein the local perlitization grain transformation is carried out at a temperature which is lower than the temperature at which the local induction hardening is carried out.

6. The process according to claim 3, wherein the local perlitization grain transformation is carried out at a temperature which is lower than a temperature at which the local induction hardening is carried out.

7. The process according to claim 2, wherein the local perlitization grain transformation is carried out at a temperature which is lower than a temperature at which the local induction hardening is carried out.

8. The process according to claim 1, wherein a ratio of a duration of the local perlitization grain transformation to a duration of the local induction hardening is in a range from 0.8 to 1.2.

9. The process according to claim 8, wherein the local inductive diffusion heat treatment is carried out at a temperature which is the same as or lower than a temperature at which the local induction hardening is carried out.

10. The process according to claim 9, wherein the local perlitization grain transformation is carried out at a temperature which is lower than the temperature at which the local induction hardening is carried out.

11. The process according to claim 8, wherein the local perlitization grain transformation is carried out at a temperature which is lower than a temperature at which the local induction hardening is carried out.

12. The process according to claim 1, wherein the local inductive diffusion heat treatment is carried out at a temperature which is the same as or lower than a temperature at which the local induction hardening is carried out.

13. The process according to claim 12, wherein the local perlitization grain transformation is carried out at a temperature which is lower than the temperature at which the local induction hardening is carried out.

14. The process according to claim 1, wherein the local perlitization grain transformation is carried out at a temperature which is lower than a temperature at which the local induction hardening is carried out.

15. The process according to claim 1, wherein the workpiece is a cast iron workpiece.

16. The process according to claim 15, wherein a duration of the local inductive diffusion heat treatment is between 30 percent and 80 percent of a duration of the local induction hardening.

17. The process according to claim 16, wherein a duration of the local perlitization grain transformation is between 80 percent and 120 percent of the duration of the local induction hardening.

18. The process according to claim 17, wherein:
   the local inductive diffusion heat treatment is carried out at a temperature between 900° C. and 1150° C.; and
   the local perlitization grain transformation is carried out at a temperature of between 500° C. and 800° C.

19. The process according to claim 18, wherein the local induction hardening is carried out at about 1050° C.

* * * * *